United States Patent [19]

Snodgrass

[11] 4,359,041
[45] Nov. 16, 1982

[54] LIGHT ENERGY CONCENTRATING DEVICE

[76] Inventor: Erlin E. Snodgrass, 11616 Kirkwood, Stafford, Tex. 77477

[21] Appl. No.: 89,993

[22] Filed: Oct. 31, 1979

[51] Int. Cl.$^3$ .............................................. F24J 3/02
[52] U.S. Cl. .................................. 126/424; 126/438; 350/293
[58] Field of Search ............... 126/424, 438, 439, 451; 350/293, 299; 353/3

[56] References Cited

U.S. PATENT DOCUMENTS

| | | | |
|---|---|---|---|
| 514,669 | 2/1894 | Allingham | 126/438 |
| 820,127 | 5/1906 | Pope | 126/438 |
| 1,951,404 | 3/1934 | Goddard | 126/438 |
| 3,483,871 | 12/1969 | Wilson | 350/296 X |
| 4,056,313 | 11/1977 | Arbogast | 353/3 |
| 4,116,541 | 9/1978 | Weiss | 350/296 |

*Primary Examiner*—Samuel Scott
*Assistant Examiner*—Lee E. Barrett

[57] ABSTRACT

A device for concentrating light to a focal region. The device includes a plurality of segments which are capable of reflecting light and which are arranged for rotation about two axes, one offset with respect to the other. The segments are mutually co-operable to pivot in unison about the two axes in order to direct light to the focal region. A light energy receiving medium is generally positioned in the focal region.

2 Claims, 6 Drawing Figures

U.S. Patent Nov. 16, 1982 Sheet 1 of 3 4,359,041
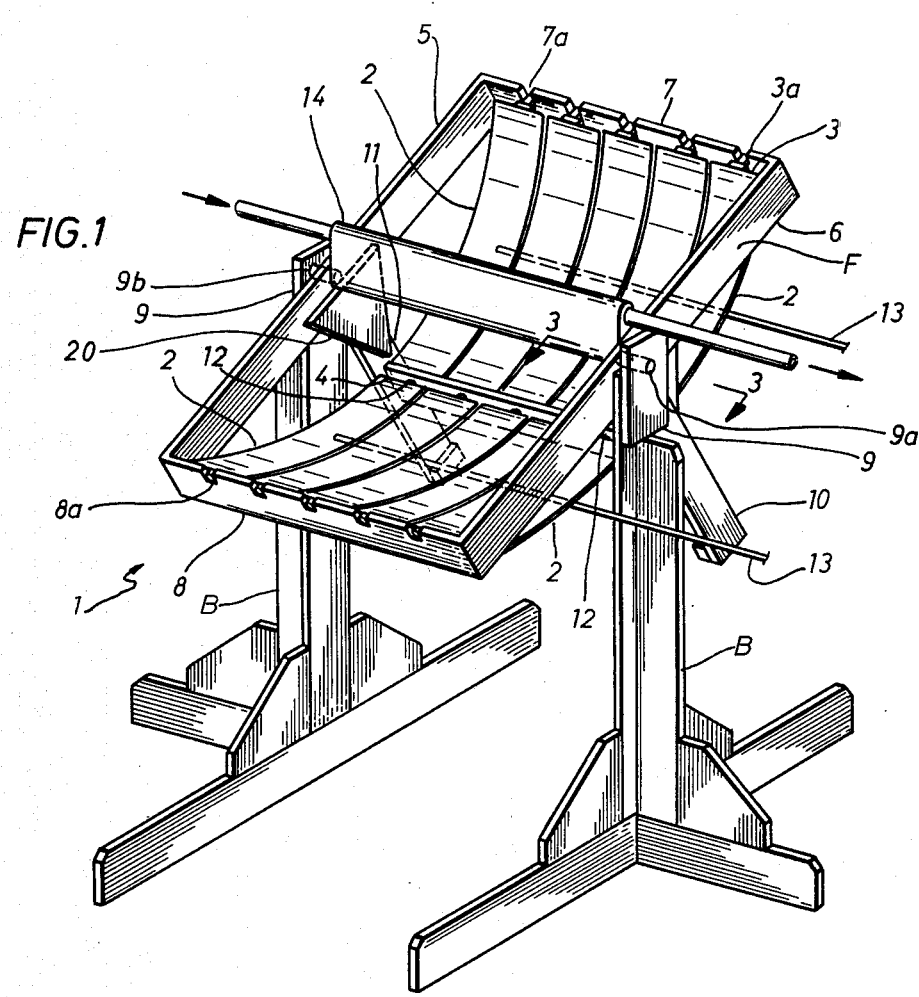
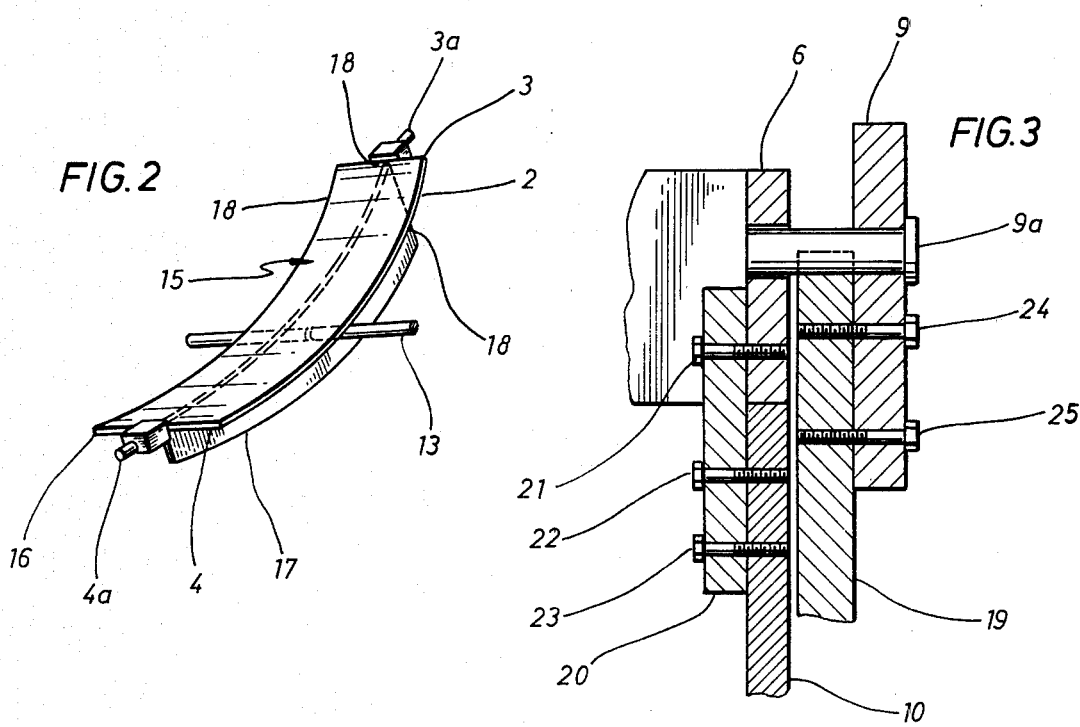

LIGHT ENERGY CONCENTRATING DEVICE

BACKGROUND OF THE INVENTION

This invention is concerned with the field of light energy concentrating devices. More specifically, this invention is related to devices comprising a plurality of segments which are capable of reflecting light and which are pivotable in unison about two axes in order to direct light, emanating from a moving source, to a focal region.

Although the relatively recent realization of the possibility of severe energy shortages has been a motivating force for research and development in the field of solar energy concentrating devices, the art of using devices for such a purpose is quite old. Indeed, years ago scientists discovered that certain devices were better suited for concentrating energy than others. Many solar energy concentrating devices which have been proposed utilize a system of reflective surfaces to focus or concentrate light onto a receiver. For example, U.S. Pat. Nos. 1,951,404, 3,254,207, 4,088,121, and 4,147,414 disclose such devices.

It has long been known that a parabolically shaped reflector can be used to concentrate light beams on the focus of the parabola. A parabola, in mathematical terms, is the locus of points which lie in a plane equidistant from a given point, called the focus, and a given line, called the directrix. Thomas, Jr., George B., CALCULUS AND ANALYTIC GEOMETRY, Addison-Wesley Publishing Co., Inc., 1965, 3rd Edition, P. 465. The unique geometry of a parabola results in rays of light coming into the parabola at an angle perpendicular to the directrix (parallel to the axis of the parabola), being concentrated at the parabola's focus. This occurs assuming the correctness of the optical relationship such that the angle of reflection of a ray of light striking a mirror is equal to the angle of incidence.

Although these fundamental geometrical and optical relationships have been known for quite some time, a relatively simple, easily built and easily maintained device for effectively and efficiently concentrating solar energy has eluded the art. This is not to suggest that solar energy devices attempting to exploit the advantageous geometrical relationships of parabolas have not been considered. Quite to the contrary, such devices have apparently been considered by practitioners in the art, but because of practical considerations these devices have apparently not been universally accepted.

There are several examples of solar energy concentrating devices disclosed in Jan. F. Kreider et al.'s SOLAR HEATING AND COOLING, Engineering, Practical Design and Economics, revised first edition, Hemisphere Publishing Corp., 1977. For example, on page 82 of that book it is disclosed that a large parabolic mirror was used in 1878 to focus solar rays onto an absorber placed at the parabola's focus. Also disclosed on that same page of the book is a trough-type parabolic reflector which was movable to maintain the sun's rays perpendicular to the directrix of the parabola. In that device, a tubular absorber was placed along the parabola's focus in order to receive the concentrated sunlight.

Kreider's book (on page 83) also discloses several relatively new solar concentrating devices which provide for solar concentration without the need of moving the reflectors. One of the devices, called SRTA (stationary reflector/tracking absorber), apparently utilizes a fixed parabolically shaped reflector and a movable absorber. Another device, called CPC (compound parabolic concentrator), was developed by Roland Winston at Argonne National Laboratory, Argonne, Illinois, and consists of two sections of a parabola which form a trough-like solar concentrator.

Even with the development of these devices, there still appears to be a need for a rather simple, efficient and economic device for concentrating light.

SUMMARY OF THE INVENTION

The device which has so escaped the art is provided by the instant discovery. The device which is the subject of the instant discovery comprises a plurality of segments which are capable of reflecting light and which are mutually co-operable to rotate in unison about two axes, one offset from the other. The rotation of the segments in unison permits the direction of incoming light, emanating from a moving source, to a focal region where a light energy receiving medium may be placed. Although the moving light source utilized in conjunction with the device of the instant invention might be a laser beam, microwave energy from an earth-orbiting satellite or any other type of moving light source sought to be received, the device of the instant invention is most desirably used to concentrate solar energy. Hence, it should be understood that although much of this description makes specific reference to solar energy, light from other moving sources may also be concentrated by use of the instant discovery.

In the preferred embodiment, this discovery advantageously uses the geometry of a parabola to provide an efficient device for concentrating solar energy. In this embodiment, the device comprises a plurality of interconnected, half-parabolically shaped segments. The segments are adapted to reflect light and in one position form a half-parabolically shaped trough. The segments are pivotable in unison about two axes in order to track the sun's light and focus the reflected rays onto a focal region. In the focal region, there may be placed a solar energy receiving medium which can be fixed substantially along a line formed by the loci of the foci of each half-parabolically shaped segment when the segments are in a position such that a half-parabolically shaped trough is formed. The solar energy receiving medium may be of any suitable type including a heat exchange or solar cell apparatus.

The device of the instant invention is capable of concentrating the sun's light any time of day throughout the various seasons of the year. In order to track the sun's declination, i.e., its movement from season to season, the half-parabolically shaped segments are pivotable in unison about a first axis, which axis is defined by a line connecting the pivot point of the vertex of each segment with the pivot point of the aperture of each respective segment. To track the sun's azimuth, i.e., the sun's path in the heavens during the period of light of one day, the segments are pivotable in unison about a second axis defined by a line on which the solar energy receiving medium is fixed. In tracking either or both the sun's azimuth and declination, means may be employed to pivot the segments in unison about the respective axes.

The segments which may be employed in the device of the instant invention are preferably of a half-parabolic shape, i.e., each segment includes that portion of a parabola starting with the vertex of the parabola and terminating with the parabola's aperture. Preferably the aperture of the segment is in a plane which is parallel to the parabola's directrix and which passes through the parabola's focus.

The half-parabolically shaped segments may be pivotably mounted in an pivotable frame such that the segments are pivotable in unison about two axes in order to track the sun's light. The segments which are pivotably mounted in the frame in one position form a half-parabolically shaped through. The alignment of the individual segments in the trough is especially critical when the device is used in an environment where the sun's azimuth and declination pass through or achieve extreme positions. In such a use, if the segments are not properly aligned, the distortion or focus of the segments when tracking the sun at the extreme positions will not be optimal. This criticality of alignment of segments is diminished somewhat when optimal efficiency of the device is not required.

With regard to the width of each individual segment, it should be recognized that, for a given segment width, the longer the distance from the vertex to the focal point, the less distortion there will be, assuming that the device fully tracks the sun from extremes in declination and azimuth positions.

Other than the fact that the segments in the preferred embodiment should be substantially parabolic in shape, the other size and shape parameters are not especially critical. Reference to "parabolic shape or parabolic in shape" or words of similar import are not intended to suggest that the particular geometric configuration must strictly conform to the esoteric mathematical definition as discussed supra in the BACKGROUND OF THE INVENTION; rather, those words are intended to describe geometric configurations which are generally in accordance with the aforementioned mathematical relationship. However, it should be understood that the closer the actual configuration of each segment conforms to the mathematical relationship, the more efficient the device can be.

The width of the segment may be of any suitable dimension, depending upon the energy requirements among other factors. The shape of the sides of the segments is not especially critical; however, the optimum and preferred shape of the sides is arcuate in nature.

The device of the instant discovery may be used alone as one unit or may be mated with the opposing half of the parabolic segments. These opposing half parabolic segments together may be utilized to concentrate energy along both sides of a solar energy receiving medium. In such a configuration, the device in one position forms a full parabolic trough. Of course, heat or energy requirements will likely dictate whether such a tandem operation is required. Similarly, any configuration of a series and/or a parallel operation of the devices of this invention may be utilized together. The segments in each unit should desirably be of the same size and configuration for efficiency; however, when employing several units in series or parallel, the size of the segments in each unit may vary depending upon many factors, including the particular use of the solar concentrating device and the energy requirements.

BRIEF DESCRIPTION OF THE DRAWINGS

The invention will be more fully understood and appreciated from the following detailed description of a preferred embodiment taken in connection with the accompanying drawings, in which:

FIG. 1 is a perspective view of a solar energy concentrating device which embodies the teachings of this invention;

FIG. 2 is a perspective view of one segment utilized in the solar concentrating device illustrated in FIG. 1;

FIG. 3 is a sectional view taken on a line 3—3 in FIG. 1;

DESCRIPTION OF THE PREFERRED EMBODIMENT

Figure 4:
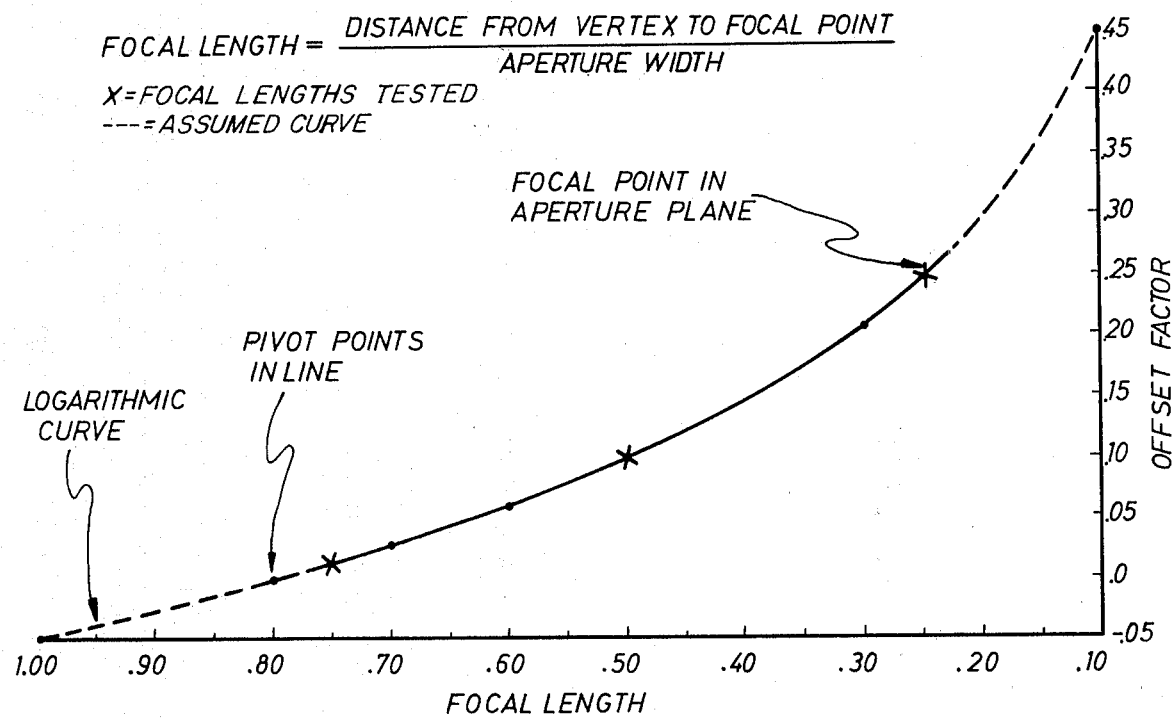
FIG. 4 is a graph which describes the relationship between the offset of the segments and the focal length of each segment.

Throughout the following description, similar reference numerals refer to similar elements in all figures of the drawings.

Referring to FIG. 1, there is illustrated the preferred embodiment of the solar energy concentrating device of the instant invention. The preferred device numeral 1 is shown to include a plurality of half-parabolically shaped segments 2 which are pivotally mounted at points 3a and 4a on a frame F. Although the segments 2 are illustrated as having straight sides, it should be recognized that the preferred shape of the sides of the segments is arcuate in nature.

The upper part of frame F is substantially rectangular in shape and consists of sides 5 and 6 which are pivotally mounted on dowel pin passer 9 by dowel pins 9a and 9b. Sides 5 and 6 may be suitably attached, such as by nails or other means, to the ends of frame 7 and 8. These ends 7 and 8 should be notched as illustrated by 7a and 8a. The notches should be spaced sufficiently apart such that the distance between the midpoints of each of the notches is at least equal in dimension to the width of a segment.

The frame F also includes two pivot arms 10 and 11. Attached between pivot arms 10 and 11 is dual segment holder 12 to which segments 2 are pivotally mounted by placing dowel pins 4a in the appropriate holes 12a made in the holder 12.

Pivot rods 13 are attached to segments 2 by an arrangement such that the segments are pivoted in unison when the rods are moved longitudinally. Although not precisely illustrated in the drawings, it should be understood that pivot rods 13 may be attached to each segment by any suitable flexible connector such as a ball and socket joint, universal joint, etc. Pivot rods 13 might also be screwshape in nature, and the bottom of each segment could be geared so that angular rotation of the rod 13 would cause pivoting of the segments. Of course, any other suitable means to cause pivoting of the segments about points 3a and 4a may be utilized. The rods might be connected to an electric motor to provide for the necessary angular or longitudinal motion, whichever might be required.

Between sides 5 and 6 of the frame is fixed in position an energy absorber 14. In the preferred embodiment, the absorber is a pipe which is painted black in order to absorb the maximum amount of sunlight from the reflecting segments. The absorber is adapted to carry water or another fluid to which the heat absorbed on its surface can be transferred. The absorber should be fixed substantially along the focal point of each of the various segments in order to absorb the optimum amount of reflected light.

FIG. 1 illustrates a dual parabolic solar concentrator. The segments 2 on both sides of the absorber, in the position illustrated, form a full parabolic trough. It is in this parabolic trough position that the loci of the foci of each parabolic segment is determined. Once determined, a solar energy receiving medium of some sort can be placed along that loci so that the reflected sunlight can be received.

Although FIG. 1 illustrates a dual parabolic solar reflector wherein sunlight can be directed to both sides of absorber 14, it should be appreciated that in some applications only one side of the parabolic trough need be utilized. In such a circumstance it should be understood that all of the segments on one side of the absorber can be removed to leave segments which in one position form a half parabolic trough. Similarly it should be recognized that a simplified device can be constructed which will only hold segments which in one position form a half-parabolically shaped trough, thereby obviating the need, for example, of one half of the upper portion of frame F as illustrated in FIG. 1.

Referring now to FIG. 2, there is shown a segment of the type which can be utilized in the structure illustrated in FIG. 1. The segment 2 may be made entirely of wood or any other lightweight material including aluminum or plastic. The surface of the segment should be covered with a reflective material such as aluminized acrylic commercialized by 3M Company. Preferably the reflective material should be Scotchcal Film Code 5400 with a pressure sensitive adhesive backing.

The segment 2 is half parabolic in shape. Side 4 of the segment is the vertex of the parabolic segment while end 3 is the aperture of the parabolic segment. Preferably the shape of the segment is parabolic and conforms to the precise mathematical relationship of a parabola. However, depending upon several factors, including the design efficiency of the device and the energy requirements of the device, the geometrical configuration of the segment may deviate somewhat from a true parabolic configuration.

The parabolic surface 16 of the segment 2 is supported by support structure 17. In making the parabolic segment 2, the support structure may be cut in the general parabolic shape required. Then the parabolic surface 16, preferably made of a light pliable wood, can be made to conform to the top surface 18 of the support structure 17. The parabolic surface 16 may be affixed to support structure 17 by any suitable means including nailing. Dowel pins 3a and 4a are provided at the ends of the support structure 17 in order to facilitate pivoting of the segment.

The shape of the sides 18 of the segment is not especially critical; however, the preferred shape is arcuate in nature. Although not preferred, the shape of the sides of a segment may be determined by calculating the radius (r) of the arc by using a predetermined formula, constructing the arc in a plane which passes through, for example, the aperture and vertex ends of the segments (3 and 4 as illustrated in FIG. 2) and projecting the constructed arc down perpendicularly from the plane onto the parabolically shaped surface 16. In particular the construction is as follows: The most optimum arcuate shape may be made by first forming the arcuate shape on an imaginary plane. The imaginary plane includes the lines connecting the respective pivot points of each segment as they lie in the position in which the half parabolic trough is formed. Then, each point of the arc formed in that plane may be transferred perpendicularly to the segment in order to define the arcuate shape of the sides of the segment. The radius of the arc is determined by the following relationship:

$$\frac{\frac{1}{2}\left(\overline{\text{parabola depth}}^2 + \overline{\frac{1}{2} \text{ aperture width}}^2\right)}{\text{parabola depth}}$$

The center of the arc is located at a point where the radial distance (r) as measured from either the vertex or aperture pivot point intersects a line perpendicular to the line on which are located both the vertex and aperture pivot points of each respective segment. Thus, in constructing a half-parabolic segment having the preferred arcuate side shape, the distance r should be determined from the above formula where:

parabolic depth is the perpendicular distance from the plane of the segment's aperture to the segment's vertex point; and aperture width is twice the perpendicular distance from the segment's aperture to a line which is perpendicular to the segment's vertex and passes through the segment's focal point.

The above formula for determining the radius of the arcuate sides of the segments is not the most preferred manner of determining the optimum shape of the sides of the segments. The most preferred manner of determining the shape of the sides of each segment is to actually build a segment and test it to ascertain the optimum shape of the segment's sides. A segment may be constructed in the following manner:

A support structure 17 as illustrated in FIG. 2 should first be built. That structure 17 should have an upper surface having the desired parabolic shape. Next the pliable material used to form the parabolic surface (16 as illustrated) can be cut of a rectangular shape, and that pliable piece can be affixed to structure 17 to form the parabolic surface. Next, a frame, support structure and a piece of wood or other suitable material used to simulate the absorber as illustrated in FIG. 1 should be built; however, the pivot points on end of frame 7 and dual segment holder 12 should not be cut. These points should be cut in accordance with the description infra concerning the preferred alignment of segments. Once those pivot points are determined, the preferred segment can be suitably set into a position such that it can pivot about points 3a and 4a.

After placing the segment, the frame, base and placed segment should be aligned with the sun such that the sun's azimuth will be parallel to segment's vertex line. The purpose of this particular alignment is to simulate the sun's declination and thus accomplish testing in several hours which would otherwise require a full six months.

After these preparatory steps, testing in bright sunlight can be initiated to determine the optimum shape of the centerline of the segments. First the parabolic surface should be painted with a flat black point. Second, a small circle of reflective paint should be painted on the segment's surface at the aperture end precisely at the pivot point. Next the segment should be pivoted until the reflected spot rests on a point in about the center of the piece of wood or other material used to simulate the absorber. Then a focal line can be drawn through that point and about along the centerline of the board. The pivotal angle used to reflect light from the painted pivot point to a point at about the center of the board must be maintained throughout the remainder of this determination of the shape of the segment's centerline. Next, a small circle of reflective material can be moved around on the segments surface and each location marked where the reflected spot rests on the focal line which has been previously drawn on the simulated absorber. Interconnection of these located points will then form the arc of the centerline of the segment. The two segment sides may then be located equidistant from the centerline. The distance of course depending upon the desired segment width.

After this is accomplished, it may be desirable to determine the reflective distortion which may occur at the sides of the segment when the segment is pivoted about its axis of rotation. When this pivoting is undertaken some distortion should be noticeable when the segments are pivoted from the position at which a half parabolic trough is formed. This noted distortion is a function of many factors including the segment's focal length, the pivotal angle and the segment's width. The distortion can be reduced by: (1) employing segments with larger focal lengths; (2) reducing the pivotal angle; and (3) reducing the width of a segment. Note that distortion attributable to segment width is thought to be non-linear throughout the length of the segment and, in particular, it is believed to be worse at the extreme positions of the aperture end of the segment.

Once the shape of the sides is determined, the pliable surface can be removed from the support structure, cut into suitable shape and used as a form from which the other segment surfaces can be made. Also an absorber can be positioned in place of the simulated absorber so that the centerline of the absorber coincides with focal line drawn on the simulated absorber.

Figure 6:
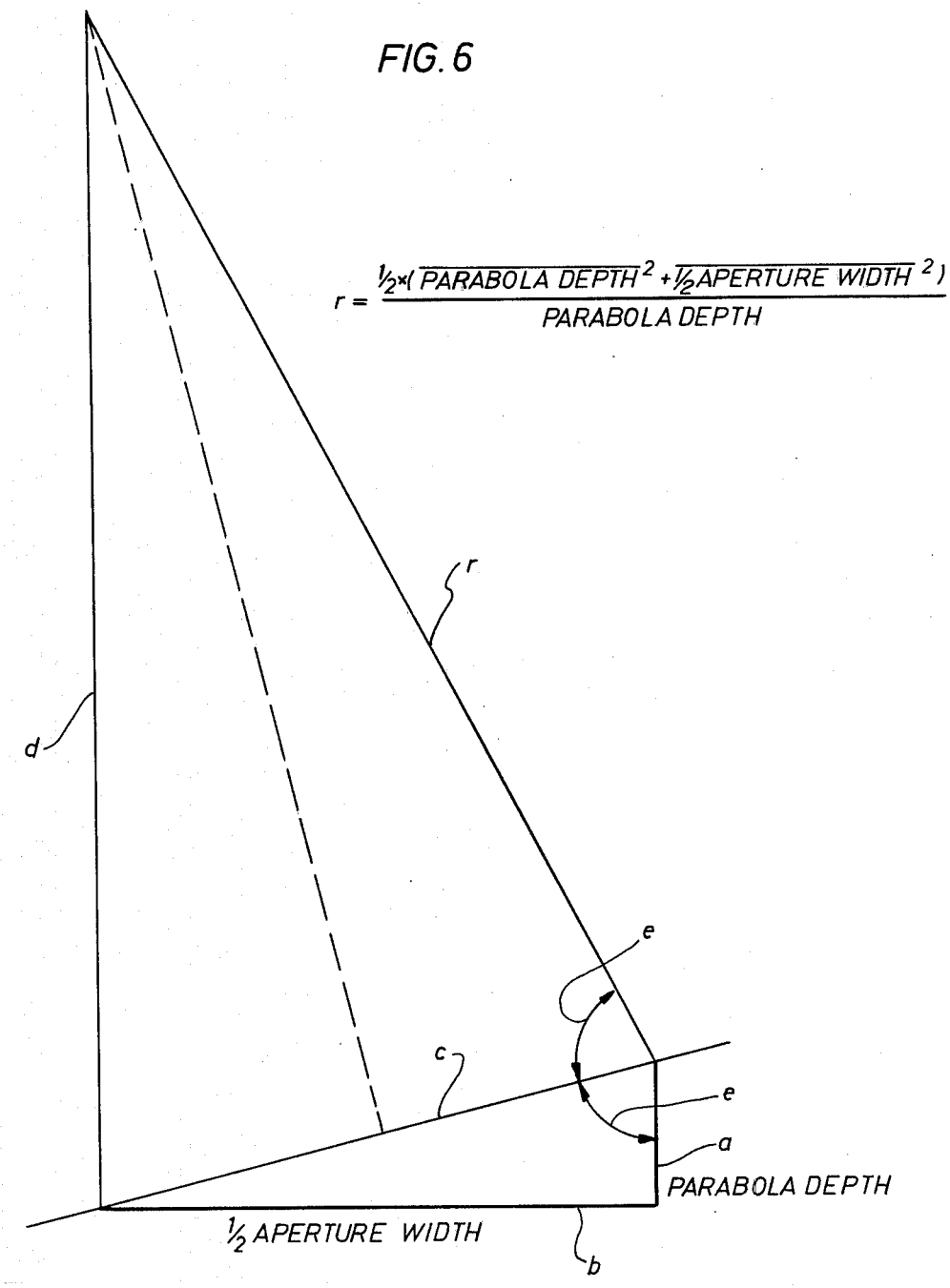
FIG. 6 is an illustration of how an arc used to form the sides of a preferred segment may be constructed.

Reference should be made to FIG. 6 which illustrates the manner in which the arc can be formed in a plane through which ends 3 and 4 of the segment pass. As illustrated in FIG. 6, a first right triangle is constructed having sides a, b and c (having respective lengths: parabola depth, ½ aperture width, distance between pivot points of segment). Next, a second triangle having a right triangle between sides d and b is constructed. The third side r is made by constructing it to have an angle between it and side c equal to the angle between c and a. (Note angles e are equal.)

Once the radius is determined, the arc as illustrated in the figure can be drawn, superimposed over the plane through which ends 3 and 4 pass, and the points on the arc can be projected perpendicularly from the plane onto the segment to form the sides of the segment.

Preferably, the support structure 17 is positioned along a line connecting the midpoint of the aperture of the segment 3 with the midpoint of the vertex of the segment 4.

The segment may have any suitable parabolic depth; it being understood that practical considerations will limit the aperture extending a substantial distance from the plane in which the parabola's focus lies. Most preferably, from an ease of manufacture view point and from a mechanical view point the focal length of the segment should be 0.25. From the standpoint of optimum efficiency in reflecting light the segments should have a focal length of 0.8 since at this focal length only it is believed that the light will be reflected along the absorber even when the segments are pivoted to other than nominal positions (this assumes the segments are properly aligned and shaped). When employing segments having focal lengths of 0.8 it should be understood that precise pivoting of the segments in tracking the sun's declination is not required to maintain the direction of the reflected light along the absorber. However, with segments having focal lengths other than 0.8, more precision in the pivoting of the segments when tracking the sun's declination is required in order to maintain the direction of the reflected light along the absorber.

This is another interesting phenomenon which is thought to occur only with segments having focal lengths of 0.8. It is believed that in some uses the segments having focal lengths of 0.8 which are mounted on a frame can be adjusted such that they do not, in one position, form a half parabolic trough as illustrated in FIG. 1. In this configuration the segments may be adjusted such that each segment is pivoted, about the axis defined by a line connecting its pivot points, at angles of increasing or decreasing values, as the case may be. In this particular configuration the segments are still ultimately pivoted in unison when tracking a moving source of light and the reflected light is still directed to a focal region as previously described but the reflected light, in this configuration, is concentrated along only a portion of the same focal region as opposed to the entire length.

The preferred parabolic shape of the segments is one which conforms to the equation $Y^2 = 4PX$ where $P = 25$ centimeters. Of course, the shape of the segment may vary from this precise mathematical description of a parabola depending upon many factors including energy requirements, and environment or location in which the device will likely be used.

The width of the segment should be about twenty to thirty percent (20–30%) of the value of P. For example with $P = 25$ cm the segment's width should preferably be about five to six centimeters (5–6 cm).

Also shown in FIG. 2 is pivot rod 13 which, as previously described, is suitably connected to the segment to facilitate its pivoting about points 3a and 4a.

Reference should now be made to FIG. 3 which is a sectional view taken on line 3—3 in FIG. 1. It illustrates the manner in which side of frame 6 is pivotally connected to the base B. Dowel pin 9a is passed through a hole in dowel pin passer 9 in order to pivotally mount side 6 to side base 19. Dowel pin 9a rests upon a channel made through side base 19 as illustrated. Passer 9 is affixed to side base 19 by screws 24 and 25. Dowel pin 9a passes into base 6 which is attached to V support 20 by screw 21. V support 20 is attached to pivot arm 10 by screws 22 and 23.

Once each half-parabolically shaped segment is made, it should be suitably mounted in the frame such that it will be capable of pivoting about two axes in order to track the sun's azimuth and declination. The alignment of the half-parabolically shaped segments in the frame is dependent upon the relationship between the distance from the vertex of the half parabola to the parabola's focal point and the segment's aperture width. When the focal length, that is the distance from the vertex of the parabolic segment to its focal point divided by the parabola's aperture width (2 times the perpendicular distance from the half parabola's vertex to its aperture), is equal to 0.8, there is no need to offset the segment. When the focal length is 0.8, the pivot points of each segment are aligned such that they lie in a plane which is perpendicular to the longitudinal axis of the vertex. However, when the focal length is other than 0.8, the pivot points of the segments should be offset from the imaginary plane described above by the offset factor which can be obtained from the graph which is FIG. 4.

It has been determined that the formula $$Y = 0.45 - (0.5 \log 10X)$$

represents the line graphed in FIG. 4 where X is focal length and Y is offset factor. The formula was derived from the graph and the latter was prepared from actual test data. It being understood, however, that testing is the best manner of determining the desired offset.

Once the offset factor is obtained, it is multiplied by the aperture width to determine the total offset. The segment may be offset by moving either pivot point from the imaginary plane by the total offset distance calculated or by moving both pivot points a total distance equivalent to the amount of offset. It should be understood that the direction in which the pivot points are shifted or offset is dependent upon the manner in which the solar concentrating device is ultimately aligned with respect to the sun. The pivot point of the vertex of the segment in the alignment procedure is moved away from the direction of the sun's declination, or the pivot point of the aperture of the segment may be moved toward the sun's declination, or a combination of both of these movements may be made in order to arrive at the total offset required.

As previously stated even following this offset procedure the segments having focal lengths other than 0.8 may not pivot light precisely on a small diameter absorber when the segments are pivoted and especially when pivoted to extreme positions. However, providing a larger absorber area is one manner in which this difficulty can be alleviated.

Figure 5:
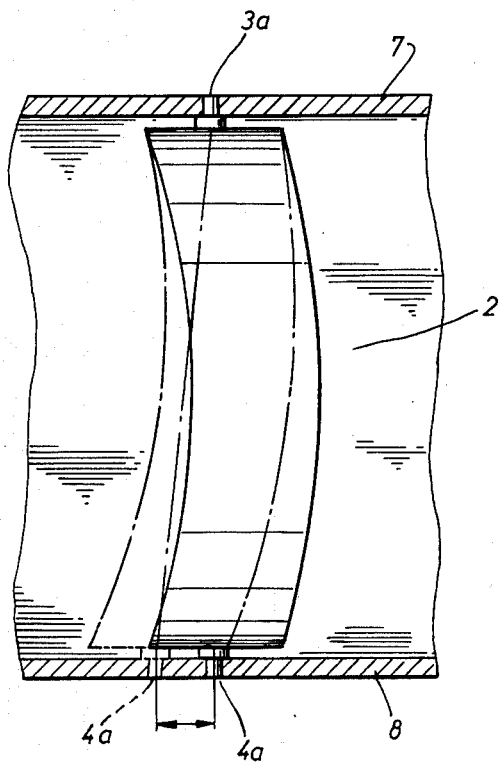
FIG. 5 is an elevational view of a half-parabolically shaped segment illustrating a manner in which the segment may be offset.

FIG. 5 illustrates the manner in which an offset of a segment may be accomplished. Although only the movement of the vertex of the segment is illustrated in FIG. 5, it should be understood that proper alignment of the segment can include movement of either or both pivot points.

When utilizing the preferred device of the instant invention, the particular orientation to the sun's movement is quite critical. The device should be oriented such that the vertex of the parabolic trough is parallel to the sun's declination. Preferably, the arcuate-shaped segments should be oriented such that the arcuate shape is concave to the sun's declination. Most preferably, the device should be set during the longest day of the year when the sun is at the midpoint of its azimuth for that day, i.e., solar noon. At that time, the vertex of the parabolic trough should be aligned parallel to the declination of the sun and should also be aligned such that the arcuate shape of the segments is concave to the sun's declination. Further, at solar noon, the trough should be positioned such that the sun's rays are perpendicular to a plane passing through the aperture of the parabolic segments.

By fixing the device of the instant invention in this manner, the piping, or other associated components used in the solar energy receiving medium may be fixed in place with the only components left to be moved during tracking being the segments themselves. Once the device has been fixed, the segments may be pivoted in unison about the axes described above in order to track the sun's light during each day of each season.

In operation, the segments may be pivoted by either manually moving pivot arm 10 and pivoting rods 13, or any type of suitable mechanical or electromechanical means may be employed to pivot the segments correctly for optimum solar concentration. Of course, the mechanisms should also provide some means of holding the segments at a certain position to obtain optimum light reflection onto the energy receiving medium.

Also, in operation, fluid should flow through absorber 14 by use of any suitable means including a pump. Of course, the flow rate of the fluid will depend upon many factors including pump size, absorber size, desired temperature and efficiency of heat transfer.

The preferred device of the instant invention is made of wood; however, any suitable material including a molded plastic material such as polyethylene, polystyrene, polyurethane or any other suitable plastic material or any lightweight metallic material may be utilized. The material used in making the parabolic surfaces of the segment 2 should be of a type which is not readily distorted when heated. If not, the heat problem can be alleviated by introducing a layer of insulation between the reflective surface of the segment and the parabolically-shaped surface of the segment.

Although FIG. 1 illustrates a device having 5 segments on both sides of absorber 14, it should be appreciated that any number of segments may be employed and that the segments need not be mounted on both sides of the absorber. Further, the segments, although illustrated to be adjacent to one another, need not be mounted in a frame in that manner. For example, every other segment could be mounted on one side of the frame. The precise number, size, shape and manner of mounting of segments will depend upon the particular application desired. However, these parameters among others can be readily determined by a reasonable amount of routine experimentation. Similarly, whether a half-parabolically shaped trough or a full parabolic trough as illustrated in FIG. 1 is employed depends upon the particular requirements of the device as well as the environment in which it is used.

Although not specifically described herein the device of the instant invention may be manually operated or in some circumstances may be fully automated. That is, with a proper control system the segments could be controlled to pivot such that, for example, the temperature of the absorber surface is maintained at a maximum.

The description of the preferred embodiment of the instant invention is not intended to limit the scope of the invention. Various modifications of the disclosed embodiment of the invention may be apparent to persons skilled in the art upon reference to this disclosure. It is therefore contemplated that the appended claims cover any such modifications or embodiments as fall within the true spirit and scope of this invention.

What is claimed is:

1. A solar concentrating reflector assembly comprising:
   a frame;
   a plurality of half-parabolically shaped reflector segments, each segment having one end defining the vertex of said half-parabola and the other end defining the aperture of said half-parabola;
   mounting means for pivotably attaching each of said segments to said frame for rotation about a first axis, said first axis defined by a line connecting the vertex end of the segment with the aperture end of the segment, said segments forming a half-parabolically shaped trough when not pivoted;
one end of said first axes being longitudinally offset from an imaginary plane perpendicular to the axis of the half-parabolically shaped trough by an amount equal to:

aperture width−[0.45 log (10 focal length)]

where the aperture width is equal to twice the perpendicular distance from the aperture of the half-parabolic trough to its vertex and the focal length is the distance from the vertex to the focal point divided by twice the aperture width;
a light energy receiving medium mounted along a line formed by the loci of the foci of each half-parabolically shaped segment when said segments are not pivoted;
means for pivoting said segments in unison about said first axes;
means for pivoting said frame about a second axis, said second axis being defined by a line on which said energy receiving medium is fixed.

2. The solar concentrating reflector assembly of claim 1 wherein each side of said segment is shaped as an arc having a radius:

$$\frac{(\text{Parabola depth})^2 + (\tfrac{1}{2} \text{ aperture width})^2}{2 \text{ (parabola depth)}}$$

where the parabola depth is the perpendicular distance from a plane passing through a segments aperture to the segments vertex.

* * * * *